(12) United States Patent
Takata et al.

(10) Patent No.: US 10,119,880 B2
(45) Date of Patent: Nov. 6, 2018

(54) LEAKAGE POSITION CALCULATION DEVICE, LEAKAGE POSITION CALCULATION METHOD, COMPUTER-READABLE RECORDING MEDIUM, VIBRATION CALCULATION DEVICE, AND COMPUTATION DEVICE

(71) Applicant: NEC Corporation, Minato-ku, Tokyo (JP)

(72) Inventors: Soichiro Takata, Tokyo (JP); Shigeru Kasai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 129 days.

(21) Appl. No.: 15/034,909

(22) PCT Filed: Oct. 20, 2014

(86) PCT No.: PCT/JP2014/005312
§ 371 (c)(1),
(2) Date: May 6, 2016

(87) PCT Pub. No.: WO2015/068343
PCT Pub. Date: May 14, 2015

(65) Prior Publication Data
US 2016/0290886 A1    Oct. 6, 2016

(30) Foreign Application Priority Data

Nov. 8, 2013  (JP) ................................ 2013-232015

(51) Int. Cl.
  *G01M 3/00* (2006.01)
  *G01M 3/24* (2006.01)
  *G01M 7/02* (2006.01)

(52) U.S. Cl.
  CPC .............. *G01M 3/00* (2013.01); *G01M 3/243* (2013.01); *G01M 7/025* (2013.01)

(58) Field of Classification Search
  CPC .......... G01M 3/243; G01M 3/00; G01M 7/025
  See application file for complete search history.

(56) References Cited

U.S. PATENT DOCUMENTS

| 5,544,074 A | * | 8/1996 | Suzuki | G01M 3/005 324/337 |
| 9,772,251 B2 | * | 9/2017 | Shinoda | G01M 3/243 |
| 2013/0269440 A1 | | 10/2013 | Maruta et al. | |

FOREIGN PATENT DOCUMENTS

| EP | 2650663 A1 | 10/2013 |
| JP | 62-130333 A | 6/1987 |

(Continued)

OTHER PUBLICATIONS

International Search Report for PCT Application No. PCT/JP2014/005312, dated Jan. 20, 2015.

(Continued)

*Primary Examiner* — Bryan Bui (57) ABSTRACT

A first time difference calculation unit calculates a time difference $\Delta t_1$ between the timing of detection of vibration that indicates the first vibration mode of a pipe P and the timing of detection of vibration that indicates a second vibration mode of the pipe P by processing a result of a measurement. A second time difference calculation unit calculates a time difference $\Delta t_2$ between the timing of detection of vibration that indicates the first vibration mode of the pipe P and the timing of detection of vibration that indicates the second vibration mode of the pipe P by processing a result of another measurement. A leakage position calculation unit uses the time differences $\Delta t_1$, $\Delta t_2$, and a space interval I between the first vibration detection unit and the first time difference calculation unit to calculate a leakage position in the pipe P.

10 Claims, 6 Drawing Sheets

(56) References Cited

FOREIGN PATENT DOCUMENTS

| | | |
|---|---|---|
| JP | 05-256726 A | 5/1993 |
| JP | 09-023483 A | 1/1997 |
| JP | 10-281921 A | 10/1998 |
| JP | 2005-134300 A | 5/2005 |
| JP | 2006-003311 A | 1/2006 |
| JP | 2013-217864 A | 10/2013 |

OTHER PUBLICATIONS

English translation of Written opinion for PCT Application No. PCT/JP2014/005312.
JP office action in counterpart JP patent application 2015-546286, dated Sep. 10, 2018.

* cited by examiner

LEAKAGE POSITION CALCULATION DEVICE, LEAKAGE POSITION CALCULATION METHOD, COMPUTER-READABLE RECORDING MEDIUM, VIBRATION CALCULATION DEVICE, AND COMPUTATION DEVICE

This application is a National Stage Entry of PCT/JP2014/005312 filed on Oct. 20, 2014 which claims priority from Japanese Patent Application 2013-232015 filed on Nov. 8, 2013, the contents of all of which are incorporated herein by reference, in their entirety.

TECHNICAL FIELD

The present invention relates to a leakage position calculation device, a leakage position calculation method, a computer-readable recording medium, a vibration calculation device, and a computation device.

BACKGROUND ART

It is difficult to detect a leakage in water pipelines and gas pipelines because the pipes are buried in the ground. To address this, PTL 1 discloses that a plurality of pressure sensors are provided on a pipe and results of detection by the pressure sensors are sent to a device at a control center. The device at the control center processes the sent results of the detection to find a leakage position.

PTL 2 discloses that a plurality of vibration sensors are attached to a pipe at a distance from each other in the direction in which the pipe extends and a leakage position is detected based on the results of detection by the vibration sensors.

CITATION LIST

Patent Literature

[PTL 1]: Japanese Laid-open Patent Publication No. 9-23483
[PTL 2]: Japanese Laid-open Patent Publication No. 2005-134300

SUMMARY OF INVENTION

Technical Problem

Since a water pipeline and a gas pipeline have great total lengths, an enormous number of vibration detectors are attached to the pipelines. It is therefore desirable to reduce the production costs associated with vibration detectors. In general, it is difficult for a plurality of vibration sensors attached to a pipe separately in an extending direction of the pipe in order to detect a leakage position unless the vibration sensors are synchronized with one another. However, a facility to synchronize a plurality of vibration sensors with one another is expensive.

A main object of the present invention is to reduce the production costs associated with a device that detects a leakage position in a pipe by using results of detection by a plurality of vibration detectors.

Solution to Problem

According to one aspect of the present invention, a leakage position calculation device is provided, which includes:

a first vibration detection means and second vibration detection means which are attached to a pipe at a distance from each other in a direction in which the pipe extends;

a first time difference calculation means for calculating a time difference $\Delta t1$ between the timing of detection of vibration that indicates a first vibration component in the pipe and the timing of detection of vibration that indicates a second vibration component in the pipe by processing a result of a measurement made by the first vibration detection means;

a second time difference calculation means for calculating a time difference $\Delta t2$ between the timing of detection of vibration that indicates the first vibration component in the pipe and the timing of detection of vibration that indicates the second vibration component in the pipe by processing a result of a measurement made by the second vibration detection means; and a leakage position calculation means for calculating a leakage position in the pipe by using the time difference $\Delta t1$, the time difference $\Delta t2$, and a space interval I between the first vibration detection means and the second vibration detection means.

According to one aspect of the present invention, a leakage position calculation method is provided, which includes:

calculating a time difference $\Delta t1$ between the timing of detection of vibration that indicates a first vibration component in a pipe and the timing of detection of vibration that indicates a second vibration component in the pipe by processing a result of a measurement made by first vibration detection means attached to the pipe;

calculating a time difference $\Delta t2$ between the timing of detection of vibration that indicates the first vibration component in the pipe and the timing of detection of vibration that indicates the second vibration component in the pipe by processing a result of a measurement made by second vibration detection means attached to the pipe at a distance from the first vibration detection means in the direction in which the pipe extends; and calculating a leakage position in the pipe by using the time difference $\Delta t1$, the time difference $\Delta t2$, and a space interval I between the first vibration detection means and the second vibration detection means.

According to one aspect of the present invention, a leakage position calculation device is provided, which includes leakage position calculation means, wherein the leakage position calculation means:

receives a time difference $\Delta t1$ between the timing of detection of vibration that indicates a first vibration component in a pipe and the timing of detection of vibration that indicates a second vibration component in the pipe, the time difference $\Delta t1$ being calculated based on a result of a measurement made by first vibration detection means attached to the pipe;

receives a time difference $\Delta t2$ between the timing of detection of vibration that indicates the first vibration component in the pipe and the timing of detection of vibration that indicates the second vibration component in the pipe, the time difference $\Delta t2$ being calculated based on a result of a measurement made by second vibration detection means attached to the pipe at a distance from the first vibration detection means in a direction in which the pipe extends; and calculates a leakage position in the pipe by using the time difference $\Delta t1$, the time difference $\Delta t2$, and a space interval I between the first vibration detection means and the second vibration detection means.

According to one aspect of the present invention, a program or a computer-readable recording medium on which the program is stored is provided, wherein the program causes a computer to effect the functions of:

receiving a time difference $\Delta t1$ between the timing of detection of vibration that indicates a first vibration component in a pipe and the timing of detection of vibration that indicates a second vibration component in the pipe, the time difference $\Delta t1$ being calculated based on a result of a measurement made by first vibration detection means attached to the pipe;

receiving a time difference $\Delta t2$ between the timing of detection of vibration that indicates the first vibration component in the pipe and the timing of detection of vibration that indicates the second vibration component in the pipe, the time difference $\Delta t2$ being calculated based on a result of a measurement made by second vibration detection means attached to the pipe at a distance from the first vibration detection means in a direction in which the pipe extends; and calculating a leakage position in the pipe by using the time difference $\Delta t1$, the time difference $\Delta t2$, and a space interval I between the first vibration detection means and the second vibration detection means.

According to one aspect of the present invention, a vibration calculation device is provided, which includes:

vibration detection means attached to a pipe; and time difference calculation means for processing a result of a measurement made by the vibration detection means to calculate a time difference $\Delta t$ between the timing of detection of vibration that indicates a first vibration component in the pipe and the timing of detection of vibration that indicates a second vibration component in the pipe, and sending the time difference $\Delta t$ to the outside.

According to one aspect of the present invention, a program or a computer-readable recording medium on which the program is stored is provided, wherein the program causes a computer to effect the function of:

processing a result of a measurement made by vibration detection means attached to a pipe to calculate a time difference $\Delta t$ between the timing of detection of vibration that indicates a first vibration component in the pipe and the timing of detection of vibration that indicates a second vibration component in the pipe, and sending the time difference $\Delta t$ to the outside.

Advantageous Effects of Invention

According to the present invention, it is possible to reduce the production costs associated with a device that uses results of detection by a plurality of vibration detectors to detect a leakage position in a pipe.

DESCRIPTION OF EMBODIMENTS

Exemplary embodiments of the present invention will be described below with reference to drawings. Like components are given like reference numerals throughout the drawings and descriptions of those components will be omitted as appropriate.

Figure 6:
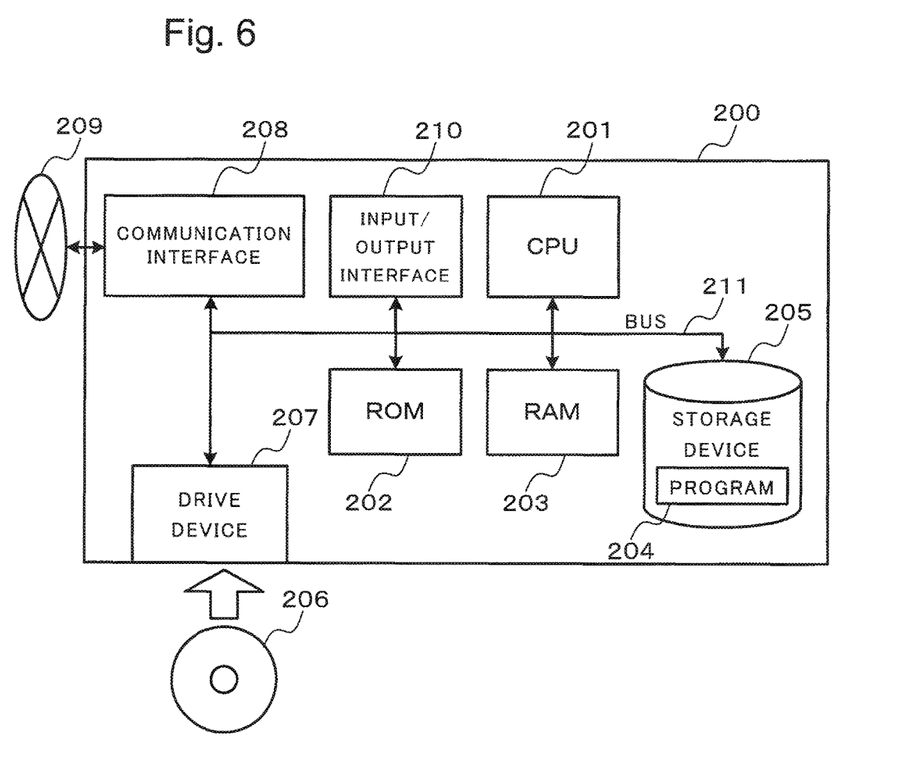
FIG. 6 is a diagram illustrating an example of a configuration of an information processing device that can implement a leakage position calculation device according to each of the exemplary embodiments of the present invention.

Note that in the following description, components of a leakage position calculation device 10 indicate blocks of functional units, rather than individual hardware units. The components of the leakage position calculation device 10 may be implemented by an information processing device 200 as illustrated in FIG. 6, for example. The information processing 200 includes the following components, for example:

CPU (Central Processing Unit) 201
ROM (Read Only Memory) 202
RAM (Random Access Memory) 203
Program 204 loaded onto the RAM
A storage device 205 storing the program
A drive device 207 which reads and writes a recording medium 206
A communication interface 208 which connects to a network 209
An input/output interface 210 which inputs and outputs data
A bus 211 which interconnects the components There are various variations of methods and devices that implement the components of the leakage position calculation device 100.

(First Exemplary Embodiment)

Figure 1:
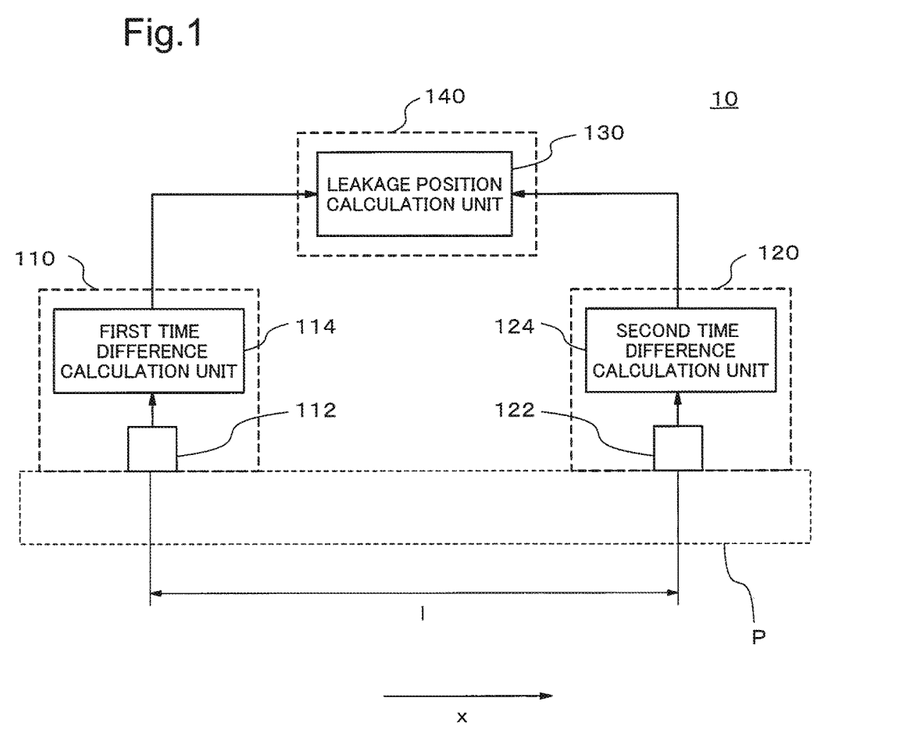
FIG. 1 is a block diagram illustrating a functional configuration of a leakage position calculation device according to a first exemplary embodiment of the present invention.

FIG. 1 is a block diagram illustrating a functional configuration of a leakage position calculation device 10 according to a first exemplary embodiment. The leakage position calculation device 10 according to this exemplary embodiment includes a first vibration detection unit 112, a second vibration detection unit 122, a first time difference calculation unit 114, a second time difference calculation unit 124, and a leakage position calculation unit 130. The first vibration detection unit 112 and the second vibration detection unit 122 are attached to a pipe P separately each other in a direction in which the pipe P extends (the direction indicated by x in FIG. 1). Note that the first vibration detection unit 112 and the second vibration detection unit 122 are not necessarily directly attached to the pipe P as long as they are capable of detecting vibration propagating through the pipe P. The first vibration detection unit 112 and the second vibration detection unit 122 may be attached at any locations where vibration propagating through the pipe P can be detected, such as fire hydrants or water stop valves (not depicted) which are provided in association with the pipe P, for example. Specific means that implement the first vibration detection unit 112 and the second vibration detection unit 122 will be described later. The first time difference calculation unit 114 calculates a time difference $\Delta t1$ between the timing of detection of vibration that indicates a first vibration component in the pipe P and the timing of detection of vibration that indicates a second vibration component in the pipe P by processing a result of a measurement made by the first vibration detection unit 112. The second time difference calculation unit 124 calculates a time difference $\Delta t2$ between the timing of detection of vibration that indicates the first vibration component in the pipe P and the timing of detection of vibration that indicates the second vibration component in the pipe P by processing a result of a measurement made by the second vibration detection unit 122 to. The leakage position calculation unit 130 calculates a leakage position in the pipe P by using the time differences Δt1, Δt2 and a space interval I between the first vibration detection unit 112 and the second vibration detection unit 122.

In this exemplary embodiment, the first vibration component in the pipe P and the second vibration component in the pipe P are vibration components that are different from each other, for example. In this exemplary embodiment, different vibration components mean different vibration modes, for example. Different vibration modes may include both of be different types of vibrations and different resonance modes, for example. The first vibration component and the second vibration component of different vibration types may be any of longitudinal vibration mode, bending vibration mode and torsional vibration mode, for example. For example, the first vibration mode may be the longitudinal vibration mode and the second vibration mode may be the bending vibration mode. In the case of different resonance modes, the first vibration mode may be an m-th order resonance mode (m is a positive number) of the pipe P and the second vibration mode may be an n-th order resonance mode (n is a positive number and n>m) of the pipe P. Hereinafter the first vibration component will be referred to as the first vibration mode and the second vibration component will be referred to as the second vibration mode.

When vibration propagates through the same medium (for example a pipe P), the propagation velocity of the vibration in the first vibration mode and the propagation velocity of the vibration in the second vibration mode are different from each other. Accordingly, when vibration is detected in different positions, the time difference between the timing of detection of the vibration that indicates the first vibration mode and the timing of detection of the vibration that indicates the second vibration mode varies due to the distances from a leakage position (for example time differences Δt1 and Δt2). Therefore, the leakage position in the pipe P can be calculated by using the time differences Δt1, Δt2 and the space interval I without the need of synchronizing a detection signal from the first vibration detection unit 112 and a detection signal from the first time difference calculation unit 114. This will be described in detail below.

The pipe P is a pipe for flowing fluid, such as liquid or gas, and may be a water pipe, a sewerage pipe, or a pipe constituting an oil pipeline, for example. However, the pipe P is not limited to these.

The first vibration detection unit 112 may be an acceleration sensor, a velocity sensor, a displacement sensor or the like, for example. The first vibration detection unit 112 includes a piezoelectric element and an amplifier circuit which amplifies an electromotive force produced in the piezoelectric element, for example.

The first vibration detection unit 112 may be a non-contact vibration detector, for example a laser Doppler vibrometer or the like. When the first vibration detection unit 112 is a non-contact vibration detector, it achieve the advantageous effects described in the first exemplary embodiment even if the first vibration detection unit 112 may not be installed on the pipe P. Examples of the pipe P on which the first vibration detection unit 112 cannot be installed include the pipe P that has a largely uneven surface, the pipe P that is too hot or cold, and the pipe P that is too small. Furthermore, the use of a non-contact vibration detector as the first vibration detection unit 112 can prevent influences of the first vibration detection unit 112 on a result of detection of vibration of the pipe P. Examples of the pipe P whose resonance is affected by attachment of the first vibration detection unit 112 include a light-weight or soft pipe P to be analyzed.

Note that the second vibration detection unit 122 also has a configuration similar to the configuration of the first vibration detection unit 112. However, the first vibration detection unit 112 and the second vibration detection unit 122 may detect vibration of the pipe P on different principles from each other.

The first time difference calculation unit 114 detects the timing of a peak of the vibration that indicates the first vibration mode of the pipe P and the timing of a peak of the vibration that indicates the second vibration mode of the pipe P by processing a result of a measurement made by the first vibration detection unit 112. The first time difference calculation unit 114 calculates a time difference between the two timings as the time difference Δt1 between the timing of detection of vibration indicating the first vibration mode and the timing of detection of vibration indicating the second vibration mode.

The second time difference calculation unit 124 calculates the difference between the timing of a peak of the vibration that indicates the first vibration mode and the timing of a peak of the vibration that indicates the second vibration mode as the time difference Δt2 between the timing of detection of vibration indicating the first vibration mode and the timing of detection of vibration indicating the second vibration mode by performing the same process as the first time difference calculation unit 114.

The leakage position calculation unit 130 calculates a leakage position in the pipe P by using the time differences Δt1, Δt2 and the space interval I between the first vibration detection unit 112 and the first time difference calculation unit 114. The leakage position calculation unit 130 may calculate, for example, the distance L from the first vibration detection unit 112 to a leakage position LP (see FIG. 2) by using Equation (1) given below.

Figure 2:
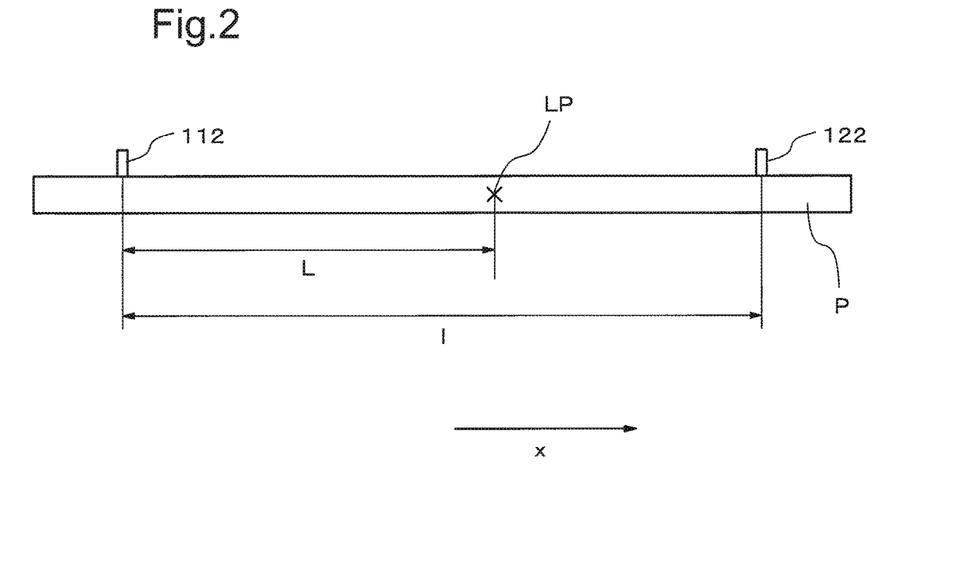
FIG. 2 is a diagram for explaining a principle of a process performed by a leakage position calculation unit.

[Equation 1]

$$L = \frac{l}{1 + \frac{\Delta t_2}{\Delta t_1}} \quad (1)$$

Equation (1) can be derived as follows (see FIG. 2). Let c1 denote the propagation velocity of vibration which indicates the first vibration mode in the pipe P and c2 denote the propagation velocity of vibration which indicates the second vibration mode in the pipe P.

Let t11 denote the time that elapses between the occurrence of vibration including the first and second vibration modes at the leakage position LP and the detection of the vibration indicating the first vibration mode by the first vibration detection unit 112, then the propagation velocity c1 can be denoted as Equation (2) given below. Let t21 denote the time that elapses between the occurrence of the vibration at the leakage position LP and the detection of the vibration indicating the second vibration mode by the first vibration detection unit 112, then the propagation velocity c2 can be denoted as Equation (3) given below.

$$c1 = L/t11 \quad (2)$$

$$c2 = L/t21 \quad (3)$$

Therefore, the time difference $\Delta t1$ can be denoted as Equation (4) given below.

$$\Delta t1 = L(1/c1 - 1/c2) \quad (4)$$

Similarly, let t12 denote the time that elapses between the occurrence of vibration including the first and second vibration modes at the leakage position LP and the detection of the vibration indicating the first vibration mode by the first time difference calculation unit 114, then the propagation velocity c1 can be denoted as Equation (5) given below. Let t22 denote the time that elapses between the occurrence of the vibration at the leakage position LP and the detection of the vibration indicating the second vibration mode, then the propagation velocity c2 can be denoted as Equation (6) given below.

$$c1 = (I-L)/t12 \quad (5)$$

$$c2 = (I-L)/t22 \quad (6)$$

Therefore, the time difference $\Delta t2$ can be denoted as Equation (7) given below.

$$\Delta t2 = (I-L) \times (1/c1 - 1/c2) \quad (7)$$

Equation (1) given above can be derived by rewriting Formulas (4) and (7).

Note that the first and second vibration components in the pipe P in this exemplary embodiment may differ in other respects than vibration mode described above. Specifically, the first and second vibration components in the pipe P may be any two vibration components different in propagation velocity (for example, vibration components in different frequency bands) of vibration propagating through the pipe P.

In this exemplary embodiment, the first vibration detection unit 112 and the first time difference calculation unit 114 are part of a first vibration measuring device 110, and the second vibration detection unit 122 and the second time difference calculation unit 124 are part of a second vibration measuring device 120. The first vibration measuring device 110 includes fixing means (for example, a magnet) for fixing the first vibration measuring device 110 to the pipe P. The same applies to the second vibration measuring device 120.

The leakage position calculation unit 130 is part of an external device 140. The external device 140 is installed in a location different from the locations of the first vibration measuring device 110 and the second vibration measuring device 120 and is connected to the first vibration measuring device 110 and the second vibration measuring device 120 through a public telecommunication network such as a radio communication network. The external device 140 may be connected to a plurality set of first vibration measuring devices 110 and second vibration measuring devices 120.

Note that the leakage position calculation device 10 does not include means for synchronizing the first vibration detection unit 112 and the first time difference calculation unit 114. Accordingly, the production costs associated with the leakage position calculation device 10 can be reduced.

Figure 3:
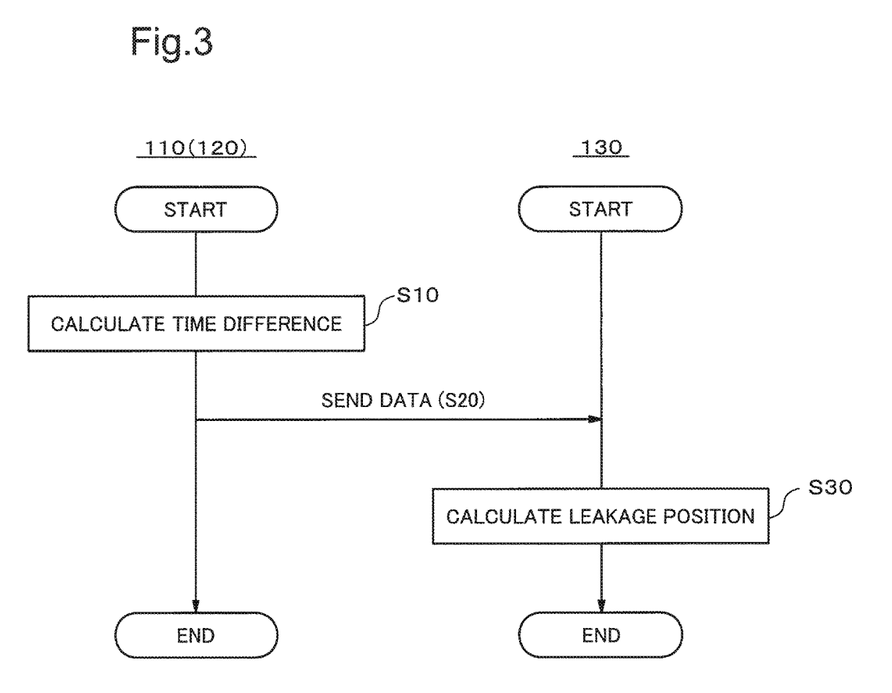
FIG. 3 is a flowchart illustrating an example of an operation of the leakage position calculation device.

FIG. 3 is a flowchart illustrating an example of an operation of the leakage position calculation device 10. If a leakage occurs in the pipe P, the leakage causes vibration beginning at the leakage position LP. The vibration includes different kinds of vibration components (vibration modes).

When the first vibration detection unit 112 of the first vibration measuring device 110 detects vibration, the first time difference calculation unit 114 calculates the time difference $\Delta t1$ (step S10). The first time difference calculation unit 114 then transmits the calculated time difference $\Delta t1$ to the leakage position calculation unit 130 (step S20).

Similarly, when the second vibration detection unit 122 of the second vibration measuring device 120 detects vibration, the second time difference calculation unit 124 calculates the time difference $\Delta t2$ (step S10). The second time difference calculation unit 124 then transmits the calculated time difference $\Delta t2$ to the leakage position calculation unit 130 (step S20).

The leakage position calculation unit 130 calculates the leakage position LP in the pipe P by processing the data received from the first vibration measuring device 110 and the second vibration measuring device 120 in accordance with Equation (1) given above, for example (step S30).

According to this exemplary embodiment described above, the leakage position calculation device 10 is capable of calculating a leakage position in the pipe P by using the time differences $\Delta t1$, $\Delta t2$ and the space interval I without the requirement of synchronizing a detection signal from the first vibration detection unit 112 and a detection signal from the first time difference calculation unit 114.

Note that the first vibration measuring device 110 may include the leakage position calculation unit 130 in this exemplary embodiment. In that case, the second vibration measuring device 120 includes means for communicating with the first vibration measuring device 110. The second time difference calculation unit 124 then sends the time difference $\Delta t2$ to the leakage position calculation unit 130 through the communication means.

(Second Exemplary Embodiment)

Figure 4:
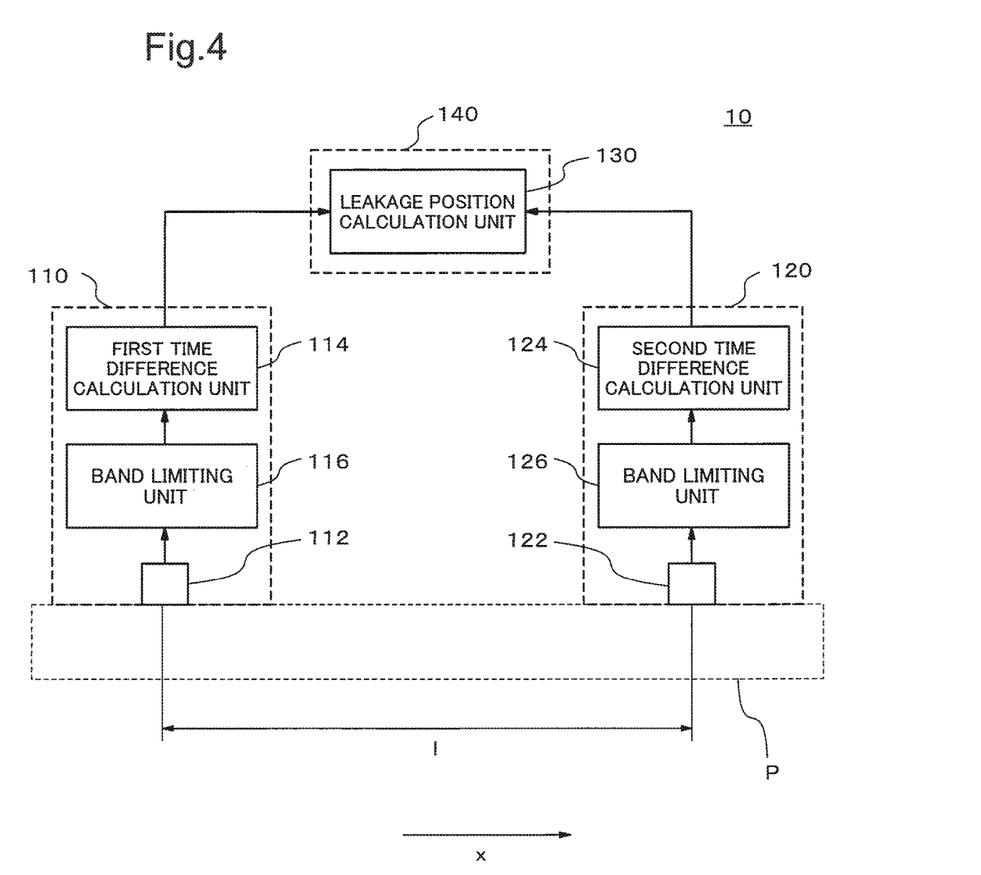
FIG. 4 is a block diagram illustrating a functional configuration of a leakage position calculation device according to a second exemplary embodiment of the present invention.

FIG. 4 is a block diagram illustrating a functional configuration of a leakage position calculation device 10 according to a second exemplary embodiment. The leakage position calculation device 10 according to this exemplary embodiment has a configuration similar to the configuration of the leakage position calculation device 10 according to the first exemplary embodiment, except that the leakage position calculation device 10 according to this exemplary embodiment includes band limiting units 116, 126.

The band limiting unit 116 is provided in a first vibration measuring device 110 whereas the band limiting unit 126 is provided in a second vibration measuring device 120. In this exemplary embodiment, a first vibration mode and a second vibration mode are resonance modes that differ from each other (an m-th order resonance mode and an n-th order resonance mode). The band limiting unit 116 extracts vibration in the m-th order resonance mode and vibration in the n-th order resonance mode from a result of detection by the first vibration detection unit 112. The band limiting unit 126 extracts vibration in the m-th order resonance mode and vibration in the n-th order resonance mode from a result of detection by the second vibration detection unit 122. The band limiting unit 116 outputs the filtered data to the first time difference calculation unit 114 and the band limiting unit 126 outputs the filtered data to the second time difference calculation unit 124. The band limiting units 116, 126 are digital filters, for example, but they may be arranged by two analog filters provided in parallel with one another.

The second exemplary embodiment can achieve the same advantageous effects as the first exemplary embodiments. In addition, the first time difference calculation unit 114 and the second time difference calculation unit 124 are capable of calculating time differences $\Delta t1$ and $\Delta t2$ easily because the band limiting unit 116 and the band limiting unit 126 are provided.

Note that in this exemplary embodiment, the first vibration measuring device 110 may include the leakage position calculation unit 130.

(Third Exemplary Embodiment)

Figure 5:
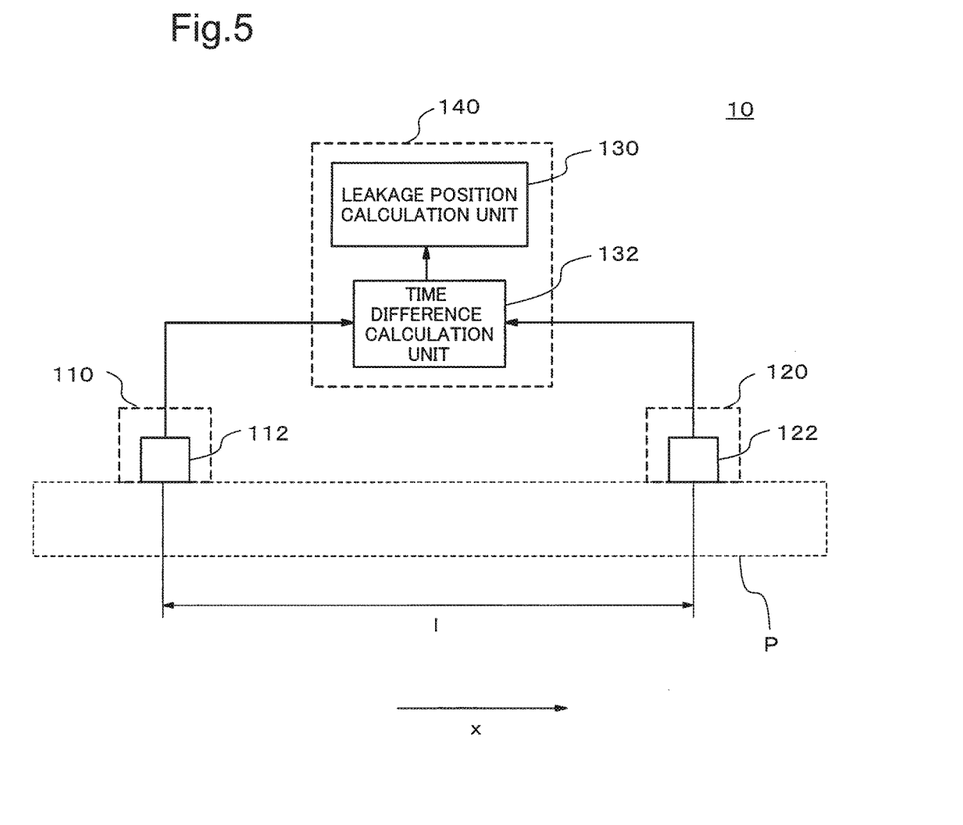
FIG. 5 is a block diagram illustrating a functional configuration of a leakage position calculation device according to a third exemplary embodiment of the present invention.

FIG. 5 is a block diagram illustrating a functional configuration of a leakage position calculation device 10 according to a third exemplary embodiment. The leakage position calculation device 10 according to this exemplary embodiment has a configuration similar to the configuration of the leakage position calculation device 10 according to the first exemplary embodiment with the following differences.

First, the first vibration measuring device 110 does not include the first time difference calculation unit 114, and the second vibration measuring device 120 also does not have the second time difference calculation unit 124. Instead, an external device 140 includes a time difference calculation unit 132. The time difference calculation unit 132 has the function similar to the functions of the first time difference calculation unit 114 and the second time difference calculation unit 124. A leakage position calculation unit 130 calculates a leakage position in a pipe P by using time differences Δt1, Δt2 which are calculated by the time difference calculation unit 132, and the space interval I between a first vibration detection unit 112 and a first time difference calculation unit 114.

The third exemplary embodiment can achieve the same advantageous effects as the first exemplary embodiment.

Note that the leakage position calculation device 10 according to the second exemplary embodiment may be configured in a similar way to the third exemplary embodiment. In that case, the band limiting units 116, 126 may be provided in the first vibration measuring device 110 and the second vibration measuring device 120, respectively, or may be provided in an external device 140. In the latter case, the external device 140 may include only one band limiting unit.

While the present invention has been described with reference to exemplary embodiments (and examples), the present invention is not limited to the exemplary embodiments (and the examples) described above.

Various modifications that are apparent to those skilled in the art may be made to the configurations and details of the present invention within the scope of the present invention.

This application is based upon and claims the benefit of priority from Japanese Patent Application No. 2013-232015 filed on Nov. 8, 2013, the entire disclosure of which is incorporated herein.

REFERENCE SIGNS LIST

10 Leakage position calculation device
110 First vibration measuring device
112 First vibration detection unit
114 First time difference calculation unit
116 Band limiting unit
120 Second vibration measuring device
122 Second vibration detection unit
124 Second time difference calculation unit
126 Band limiting unit
130 Leakage position calculating unit
132 Time difference calculation unit
140 External device (leakage position calculation device)

What is claimed is:

1. A system comprising:
a processor configured to:
calculate a time difference Δt1 between detection timing of a peak of vibration indicating a first vibration component in a pipe and detection timing of a peak of vibration indicating a second vibration component in the pipe based on a measurement result by a first vibration detector attached to the pipe, the first vibration component and the second vibration component being vibration components different in vibration mode with each other and being obtained based on a measurement result by the first vibration detector;
calculate a time difference Δt2 between detection timing of a peak of vibration indicating the first vibration component in the pipe and detection timing of a peak of vibration indicating the second vibration component in the pipe based on a measurement result by a second vibration detector attached to the pipe separately from the first vibration detector in an extending direction of the pipe, the first vibration component and the second vibration component being vibration components different in vibration mode with each other and being obtained based on a measurement result by the second vibration detector; and
calculate a leakage position in the pipe by using the time difference Δt1, the time difference Δt2, and a space interval I between the first vibration detector and the second vibration detector.

2. The system according to claim 1, the system further comprising:
a first vibration detector and a second vibration detector attached to the pipe separately in an extending direction of the pipe; and
wherein the processor further configured to:
calculate a time difference Δt1 between detection timing of vibration indicating a first vibration component in the pipe and detection timing of vibration that indicates a second vibration component in the pipe by processing a measurement result by the first vibration detector;
calculate a time difference Δt2 between detection timing of vibration indicating the first vibration component in the pipe and detection timing of vibration indicating the second vibration component in the pipe by processing a measurement result by the second vibration detector; and
calculate a leakage position in the pipe by using the time difference Δt1, the time difference Δt2, and a space interval I between the first vibration detector and the second vibration detector.

3. The system according to claim 1,
wherein the first vibration component is an m-th order resonance mode of the pipe (m is a positive number) and the second vibration component is an n-th order resonance mode of the pipe (n>m).

4. The system according to claim 1,
wherein the processor further configured to extract vibration in the m-th order resonance mode and extracting vibration in the n-th order resonance mode during each of the calculation of Δt1 and Δt2.

5. The system according to claim 1,
wherein the first vibration component is a longitudinal vibration mode and the second vibration component is a bending vibration mode.

6. The system according to claim 1,
wherein the processor further configured to calculate a distance L from the first vibration detector to the leakage position in accordance with the following Equation (1) during the calculation of the leakage position:

[Math. 1]

$$L = \frac{l}{1 + \frac{\Delta t_2}{\Delta t_1}} \quad (1)$$

7. The system according to claim 1,
wherein the processor does not configured to synchronize the first vibration detector and the second vibration detector.

8. The system according to claim 1, further comprising:
a vibration detector attached to the pipe.

9. A leakage position calculation method comprising:
calculating a time difference $\Delta t1$ between detection timing of a peak of vibration indicating a first vibration component in a pipe and detection timing of a peak of vibration indicating a second vibration component in the pipe based on a measurement result by a first vibration detector attached to the pipe, the first vibration component and the second vibration component being vibration components different in vibration mode with each other and being obtained based on a measurement result by the first vibration detector;
calculating a time difference $\Delta t2$ between detection timing of a peak of vibration indicating the first vibration component in the pipe and detection timing of a peak of vibration indicating the second vibration component in the pipe based on a measurement result by a second vibration detector attached to the pipe separately from the first vibration detector in an extending direction of the pipe, the first vibration component and the second vibration component being vibration components different in vibration mode with each other and being obtained based on a measurement result by the second vibration detector; and
calculating a leakage position in the pipe by using the time difference $\Delta t1$, the time difference $\Delta t2$, and a space interval I between the first vibration detector and the second vibration detector.

10. A non-transitory computer-readable recording medium storing a program causing a computer to function of:
calculating a time difference $\Delta t1$ between detection timing of a peak of vibration indicating a first vibration component in a pipe and detection timing of a peak of vibration indicating a second vibration component in the pipe based on a measurement result by a first vibration detector attached to the pipe, the first vibration component and the second vibration component being vibration components different in vibration mode with each other and being obtained based on a measurement result by the first vibration detector;
calculating a time difference $\Delta t2$ between detection timing of a peak of vibration indicating the first vibration component in the pipe and detection timing of a peak of vibration indicating the second vibration component in the pipe based on a measurement result by a second vibration detector attached to the pipe separately from the first vibration detector in an extending direction of the pipe, the first vibration component and the second vibration component being vibration components different in vibration mode with each other and being obtained based on a measurement result by the second vibration detector; and
calculating a leakage position in the pipe by using the time difference $\Delta t1$, the time difference $\Delta t2$, and a space interval I between the first vibration detector and the second vibration detector.

* * * * *